US011525049B2

(12) United States Patent
Kozak et al.

(10) Patent No.: US 11,525,049 B2
(45) Date of Patent: Dec. 13, 2022

(54) POLAR ADDITIVE FOR THE SYNTHESIS OF COPOLYMERS OF VINYLAROMATIC MONOMER AND CONJUGATED DIENE MONOMER HAVING HIGH VINYLAROMATIC AND LOW VINYL CONTENTS

(71) Applicants: SYNTHOS S.A., Oswiecim (PL); SYNTHOS DWORY 7 SPÓLKA Z OGRANICZONA ODPOWIEDZIALNOSCIA SPÓLKA JAWNA, Oswiecim (PL)

(72) Inventors: Radoslaw Kozak, Chorzow (PL); Robert Bogacz, Bulowice (PL); Malgorzata Walenia, Szczecin (PL); Pawel Weda, Knurow (PL)

(73) Assignees: SYNTHOS S.A., Oswiecim (PL); SYNTHOS DWORY 7 SPÓLKA Z OGRANICZONA ODPOWIEDZIALNOSCIA SPÓLKA JAWNA, Oswiecim (PL)

( * ) Notice: Subject to any disclaimer, the term of this patent is extended or adjusted under 35 U.S.C. 154(b) by 273 days.

(21) Appl. No.: 16/497,929

(22) PCT Filed: Mar. 28, 2018

(86) PCT No.: PCT/EP2018/058014
§ 371 (c)(1),
(2) Date: Sep. 26, 2019

(87) PCT Pub. No.: WO2018/178199
PCT Pub. Date: Oct. 4, 2018

(65) Prior Publication Data
US 2020/0255625 A1 Aug. 13, 2020

(30) Foreign Application Priority Data

Mar. 29, 2017 (EP) .................................. 17461514

(51) Int. Cl.
| | | |
|---|---|---|
| *C08K 5/3492* | (2006.01) | |
| *B60C 1/00* | (2006.01) | |
| *C08F 2/06* | (2006.01) | |
| *C08F 4/46* | (2006.01) | |
| *C08F 212/08* | (2006.01) | |
| *C08F 236/06* | (2006.01) | |
| *C08K 3/04* | (2006.01) | |
| *C08K 3/36* | (2006.01) | |
| *C08L 7/00* | (2006.01) | |
| *C08L 23/08* | (2006.01) | |

(52) U.S. Cl.
CPC .......... *C08K 5/3492* (2013.01); *B60C 1/0016* (2013.01); *C08F 2/06* (2013.01); *C08F 4/46* (2013.01); *C08F 212/08* (2013.01); *C08F 236/06* (2013.01); *C08K 3/04* (2013.01); *C08K 3/36* (2013.01); *C08L 7/00* (2013.01); *C08L 23/0815* (2013.01); *C08F 2800/20* (2013.01)

(58) Field of Classification Search
CPC .......... C08K 5/3492; C08K 3/04; C08K 3/36; B60C 1/0016; C08F 2/06; C08F 4/46; C08F 212/08; C08F 236/06; C08F 2800/20; C08L 7/00; C08L 23/0815
USPC ........................................................ 523/155
See application file for complete search history.

(56) References Cited

U.S. PATENT DOCUMENTS

| | | | |
|---|---|---|---|
| 3,498,960 A * | 3/1970 | Wofford | ................ C08F 236/10 526/180 |
| 3,558,575 A | 1/1971 | Keckler | |
| 3,787,377 A | 1/1974 | Halasa et al. | |
| 6,372,863 B1 | 4/2002 | Kerns et al. | |
| 6,521,712 B1 | 2/2003 | Knoll et al. | |
| 6,583,244 B1 | 6/2003 | Jasiunas et al. | |
| 8,927,644 B2 | 1/2015 | Hamann et al. | |
| 8,927,645 B2 | 1/2015 | Hamann et al. | |
| 8,981,000 B2 | 3/2015 | Hamann et al. | |
| 9,000,109 B2 | 4/2015 | Hamann et al. | |
| 2013/0345379 A1 | 12/2013 | Hamann et al. | |
| 2016/0096912 A1* | 4/2016 | Valenti | ...................... C08L 9/06 526/181 |

FOREIGN PATENT DOCUMENTS

| | | |
|---|---|---|
| CN | 101906178 A | 12/2010 |
| DE | 697 12 962 | 11/2002 |
| EP | 2 495 266 | 9/2012 |
| JP | 61268710 A | 11/1986 |
| WO | 2011/157742 | 12/2011 |
| WO | 2015153736 A1 | 10/2015 |

OTHER PUBLICATIONS

Pal et al. ("Wear Characteristics of Styrene Butadiene Rubber/ Natural Rubber Blends with Varying Carbon Blacks by DIN Abrader and Mining Rock Surfaces", Journal of Applied Polymer Science, vol. 111, 348-357, 2009) (Year: 2009).*
International Search Report for PCT/EP2018/058104 dated Aug. 31, 2018, 3 pages.
Written Opinion of the ISA for PCT/EP2018/058104 dated Aug. 31, 2018, 5 pages.
English Translation of Official Notification for Eurasia Application No. 201992291, dated Nov. 25, 2021, 3 pages.
Japanese Examination Report and English Translation issued in corresponding Japanese Application No. 2019-553501, dated Jan. 18, 2022, 5 pages.

* cited by examiner

*Primary Examiner* — Robert S Jones, Jr.
*Assistant Examiner* — Jiangtian Xu
(74) *Attorney, Agent, or Firm* — Nixon & Vanderhye P.C.

(57) ABSTRACT

The present invention relates to the use of N,N',N"-substituted hexahydro-1,3,5-triazine in the anionic polymerization of conjugated diene monomer and vinylaromatic monomer. Use of this polar additive produces copolymers having both high vinylaromatic and low vinyl contents, while the blockiness of the vinylaromatic unit can be tailored.

22 Claims, No Drawings

POLAR ADDITIVE FOR THE SYNTHESIS OF COPOLYMERS OF VINYLAROMATIC MONOMER AND CONJUGATED DIENE MONOMER HAVING HIGH VINYLAROMATIC AND LOW VINYL CONTENTS

This application is the U.S. national phase of International Application No. PCT/EP2018/058014 filed Mar. 28, 2018 which designated the U.S. and claims priority to EP Patent Application No. 17461514 filed Mar. 29, 2017, the entire contents of each of which are hereby incorporated by reference.

The present invention relates to the use of a specific polar additive for the production of a copolymer of vinylaromatic monomer and conjugated diene monomer having high vinylaromatic and low vinyl contents, via anionic polymerization. The polar additive leads to a copolymer with especially high vinylaromatic content and with a well-defined blockiness of vinylaromatic in the copolymer. The copolymer of the invention has the following characteristics: (a) a vinylaromatic content from about 30 to about 80 weight percent, based on total weight of polymer; (b) a content of vinylaromatic blocks with more than 4 repeating units from about 0.01 to about 32 weight percent, based on total vinylaromatic content; and (c) a vinyl content from more than 8 to about 45 weight percent, based on total conjugated diene polymerized fraction.

BACKGROUND OF THE INVENTION

The production of copolymers of conjugated diene monomer (e.g. 1,3-butadiene) having a randomized and high vinylaromatic content (e.g. 30 to 50 weight percent of styrene, based on total weight of polymer), or having a partially blocked ultra-high styrene content (55 to 78 weight percent of styrene, based on total weight of polymer) is not possible with standard randomizing agents such as N,N,N', N'-tetramethylethylenediamine (TMEDA) if one wants to obtain copolymers having a low vinyl content (of 45% or less). This is because these types of agents strongly promote the 1,2-addition of diene monomer, i.e. lead to copolymers having a high vinyl content. Additionally, the content of vinylaromatic monomer and the block length of vinylaromatic repeating units tend to decrease with an increasing amount of polar additive.

U.S. Pat. No. 8,927,644 B2 teaches the production of a polymer having a) a block styrene content of more than four consecutive units from about 40 to about 70 weight percent based on total styrene content in the polymer, b) a vinyl content from about 25 to about 80 weight percent based on total amount of polymerized 1,3-butadiene, c) a styrene content from about 20 to about 75 weight percent based on total weight of polymer, and d) molecular weight distribution ($M_w/M_n$) of 1.5 or less. The process involves polymerization in the presence of i) an initiator, ii) a potassium alcoholate, and iii) a polar agent which is a ditetrahydrofurylpropane (more specifically 2,2-di(2-oxolanyl)-propane). Similarly, US2013/0345379 A1 teaches a polymerization process requiring two polar agents. The first polar agent is a bis-aminoalkylene, such as tetramethylethylenediamine. The second polar agent is ditetrahydrofurylpropane (more specifically 2,2-di(2-oxolanyl)propane). The polymers obtained have a) a styrene content from about 40 to about 70 weight percent and b) a vinyl content from about 30 to about 80 weight percent based on polymerized 1,3-butadiene. The content of block styrene consisting of more than 6 consecutive styrene units given in the examples is from 6 to 17%.

U.S. Pat. No. 6,521,712 B1 teaches block copolymers comprising at least two hard blocks $S_1$ and $S_2$ made from vinylaromatic monomers and, between these, at least one random soft block B/S made from vinylaromatic monomer and diene monomer, where the proportion of the hard blocks is above 40% by weight, based on the total block copolymer. EP 0 798 339 A2 teaches the production of styrene-butadiene copolymers having, e.g., a content of styrene sequences having 4 to 20 styrene units of 40 to 65%, by weight of the total styrene content.

U.S. Pat. No. 8,927,645 B2 teaches the production of a polymer having a) a block styrene content of more than six consecutive units from about 15 to about 35 weight percent based on total styrene content in the polymer, b) a vinyl content from about 25 to about 80 weight percent based on total amount of polymerized 1,3-butadiene, c) a styrene content from about 35 to about 75 weight percent based on total weight of polymer, and d) molecular weight distribution ($M_w/M_n$) of 1.5 or less. The process involves polymerization in the presence of an initiator, a potassium alcoholate, and a polar agent which is a dialkylether. The block styrene content of more than four consecutive units may be from 60 to 80 weight percent, based on total styrene content.

Antkowiak et al. (J. Polym. Sci., Part A-1, 1972, 10, 1319) teach that the application of polar additives (modifiers) promotes the randomization of styrene in styrene-butadiene copolymer and increases the content of vinyl groups. The homopolymerization rate constant of styrene is higher than that of 1,3-butadiene. However, if styrene and butadiene are mixed, the reactivity is reversed and 1,3-butadiene tends to polymerize more rapidly than styrene. This phenomenon is observed because 1,3-butadiene, in comparison to styrene, tends to create a more stable n bond with the living center and thus 1,3-butadiene polymerization is favored. If the concentration of butadiene in a styrene/butadiene mixture is very low, then styrene starts to polymerize and a tapered or block copolymer is obtained (U.S. Pat. No. 3,558,575). This document also teaches that one can obtain copolymers of styrene and butadiene having very low blockiness if one performs the reaction at an elevated temperature. The copolymers typically have low styrene contents, of 25% or less. Also, the addition of Lewis bases, of Lewis acids (U.S. Pat. No. 3,787,377), of mixtures of Lewis bases and acids, or of n donor groups, to the polymerization system leads to an equalization of the reactivity of styrene and butadiene, and this allows random styrene-butadiene copolymer to be obtained.

U.S. Pat. No. 6,583,244 B1 discloses that metal salts of e.g. cyclic alcohols (such as sodium dodecylbenzene sulfonate, SDBS) can be used in the lithium-initiated solution polymerization of diene monomers (styrene, isoprene), provided polar additives such as Lewis acids are absent. Rubbers having low vinyl contents are thus obtained.

U.S. Pat. No. 9,000,109 B2 discloses that a polar additive system consisting of two Lewis bases, namely ditetrahydrofurylpropane (DOP) and tetramethylethylenediamine (TMEDA), leads to high styrene, high vinyl SBR with narrow molecular weight distribution, high monomer conversion, in a short reaction time and with increased livingness of polymer chains, as compared to the use of TMEDA alone. Additionally, WO2011/157742 A1 and U.S. Pat. No. 8,981,000 B2 teach that the use of ditetrahydrofurylpropane in batch, semi-batch or continuous processes may (depending on reaction conditions and concentration of polar additive applied) vary broadly and may give low vinyl or high vinyl styrene-butadiene polymer, where the styrene content may generally vary from 10 to 70 weight percent, block styrene may be less than 8 weight percent or between 27 and 50 weight percent, based on the weight of polymer, and vinyl content may be in a range from 12 to 40 or from 30 to 80 weight percent (per butadiene fraction.).

It is also possible to randomize styrene along the polymer chain by performing the copolymerization of styrene and butadiene with varying monomer (styrene, butadiene) charging ratio, and by performing the process under styrene-enriched conditions (U.S. Pat. No. 6,372,863). Polymerization is performed in two polymerization zones and results in a cement of living styrene-butadiene rubber having a vinyl content of less than 10%, wherein less than 5% of the total quantity of repeat units derived from styrene in the polymer chains are in blocks containing five or more styrene repeat units. However, in order to obtain low vinyl polymer having low blockiness, conversion in the second reactor must be kept below 95% and preferably below 93%, resulting in a product from which substantial amounts of residual monomer must be removed. The polymers typically have a low styrene content of 10 to 30 weight percent.

U.S. Pat. No. 3,498,960 B teaches that one can use triazines as randomizing agents in the copolymerization of butadiene with styrene in the presence of n-butyllithium as the catalyst. The triazine randomizing agents gives vinyl contents in the range of 13.5 to 33.2 weight percent, based on diene polymerized fraction, in low styrene copolymers (namely 25 wt. % of styrene, 75 wt. % of 1,3-butadiene).

There was therefore a need in the art for a process that provides for copolymers of vinylaromatic monomer and conjugated diene monomer, the copolymers having 1) a high vinylaromatic content, 2) a low vinyl content, and 3) low blockiness. This should be a simple and effective process, i.e. should not necessarily require polymerization to be performed in two stages, or with low conversion.

As stated in U.S. Pat. No. 8,981,000, the use of randomizers can result in high vinyl SSBR having a low block styrene content (>6 successive units of styrene) below 10%. Long block styrene can worsen hysteresis as reported, for example, by S. Futamura and G. Day who observed a worsening by about 18% of the tan delta at 60° C. when increasing block styrene content from 2 to about 7% in a carbon black-filled compound (Kautschuk Gummi Kunststoffe, 1987, 40, No. 1, 39-43). By contrast, incorporation of small styrene blocks can result in improved abrasion and tensile strengths, particularly in silica compounds, as reported by I. Hattori et al, (143rd Meeting of the Rubber Division of the ACS, Spring 1993, paper 22).

SUMMARY OF THE INVENTION

It has now surprisingly been found that a high styrene, low vinyl vinylaromatic (e.g. styrene)-conjugated diene (e.g. butadiene) rubber is obtained by anionic polymerization of vinylaromatic and conjugated diene monomers in the presence of organometallic initiator and a specific polar modifier. The polar modifier (additive) is an N,N',N''-substituted hexahydro-1,3,5-triazine, having the following formula (I):

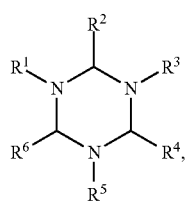

(I)

wherein each of $R^1$, $R^3$, and $R^5$ is independently an alkyl, alkenyl, cycloalkyl, cycloalkenyl or an aryl group, or a combination thereof, and $R^1$, $R^3$, and $R^5$ each have 1 to 20 carbon atoms;

and wherein each of $R^2$, $R^4$, and $R^6$ is independently H, an alkyl, alkenyl, cycloalkyl, cycloalkenyl or an aryl group, or a combination thereof, and $R^2$, $R^4$, and $R^6$ may each have up to 20 carbon atoms.

The hexahydro-1,3,5-triazine according to formula (I) acts as a polar modifier, despite being a Lewis base, and has no strong influence on vinyl content, whilst providing excellent randomization. Depending on the total styrene content, desired block styrene content, desired vinyl content and temperature of the polymerization, the hexahydro-1,3,5-triazine according to the invention is typically used in an amount so that the molar ratio of polar modifier to initiator is in the range from 0.01 to 50:1.

The copolymer of the present invention, as produced via anionic polymerization using the hexahydro-1,3,5-triazine according to formula (I), is a rubbery copolymer of vinylaromatic monomer and conjugated diene monomer, and is characterized by a content of about 30 to about 80 weight percent of vinylaromatic monomer.

According to a first aspect, the invention relates to the use of the hexahydro-1,3,5-triazine according to formula (I) as defined above, in the production of an elastomeric copolymer.

According to a second aspect, the invention relates to a method for producing an elastomeric copolymer.

According to a third aspect, the invention relates to an elastomeric copolymer having a) a content of vinylaromatic monomer from about 30 to about 80 weight percent, based on total weight of polymer; b) a content of vinylaromatic monomer blocks with more than 4 repeating units from about 0.01 to about 32 weight percent, based on total vinylaromatic monomer content; and c) a vinyl content from more than 8 to about 45 weight percent, based on total conjugated diene polymerized fraction.

According to a fourth aspect, the invention relates to a method for preparing a rubber comprising vulcanizing the elastomeric copolymer according to the third aspect in the presence of one or more vulcanizing agents.

According to a fifth aspect, the invention relates to a rubber as obtainable according to the method of the fourth aspect.

According to a sixth aspect, the invention relates to a rubber composition comprising a rubber component comprising the rubber according to the fifth aspect.

According to a seventh aspect, the invention relates to a tire component comprising the rubber composition according to the sixth aspect.

Finally, and according to an eighth aspect, the invention relates to a tire comprising the tire component according to the seventh aspect.

The present invention is based on the surprising finding that a copolymer having a content of about 30 to about 80 weight percent of vinylaromatic monomer can easily be produced by use of the hexahydro-1,3,5-triazine additive of formula (I), without the need for a complicated two-stage process, or the need to perform polymerization at low conversion (compare U.S. Pat. No. 6,372,863 B1).

The copolymer of vinylaromatic monomer (in particular styrene) and conjugated diene monomer (in particular 1,3-butadiene) can be classified as high styrene, low vinyl styrene butadiene rubber (HS-LV-SBR, for total styrene content in a range of from 30 to 50 wt %), and ultra-high styrene, low vinyl styrene butadiene rubber (UHS-LV-SBR, for a total styrene content in a range of from 50 to wt %). For both HS-LV-SBR and UHS-LV-SBR as obtained in accordance with the invention, total vinyl content is in a range of from more than 8 to about 45 weight percent, based on total conjugated diene polymerized fraction. It is thus easily possible to obtain HS-LV-SBR and UHS-LV-SBR with controllable styrene block content under the following typical polymerization conditions: a styrene wt % content from 30 to 80%, a hexahydro-1,3,5-triazine/initiator molar ratio in a range of from 0.01 to 50:1, and a polymerization temperature below 100° C.

DETAILED DESCRIPTION OF THE INVENTION

The hexahydro-1,3,5-triazine of Formula (I)

According to a first aspect, the invention relates to the use of an N,N',N''-substituted hexahydro-1,3,5-triazine having the following formula (I):

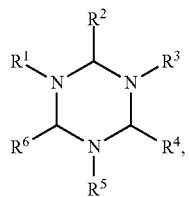

(I)

wherein each of $R^1$, $R^3$, and $R^5$ is independently an alkyl, alkenyl, cycloalkyl, cycloalkenyl or an aryl group, or a combination thereof, and $R^1$, $R^3$, and $R^5$ each have 1 to 20 carbon atoms;

and wherein each of $R^2$, $R^4$, and $R^6$ is independently H, an alkyl, alkenyl, cycloalkyl, cycloalkenyl or an aryl group, or a combination thereof, and $R^2$, $R^4$, and $R^6$ may each have up to 20 carbon atoms;

in the production of copolymers of one or more conjugated diene monomers and one or more vinylaromatic monomers, wherein the production is by anionic polymerization and in the presence of one or more anionic initiators, and wherein the copolymer has a content of about 30 to about 80 weight percent of vinylaromatic monomer, based on total weight of copolymer.

Preferably, $R^1$, $R^3$ and $R^5$ are the same and are selected from alkyl, alkenyl, cycloalkyl, cycloalkenyl and aryl groups. More preferably, $R^1$, $R^3$ and $R^5$ are the same and are alkyl groups having 1 to 20 carbon atoms, more preferably 1 to 6 carbon atoms. Most preferably, $R^1$, $R^3$ and $R^5$ are each methyl.

Also, $R^2$, $R^4$ and $R^6$ are preferably the same and are selected from H, alkyl, alkenyl, cycloalkyl, cycloalkenyl and aryl groups. Most preferably, $R^2$, $R^4$ and $R^6$ are each H.

Thus, it is most preferred for the compound of formula (I) that $R^1$, $R^3$ and $R^5$ are each methyl, and $R^2$, $R^4$ and $R^6$ are each H (hexahydro-N,N',N''-trimethyltriazine).

Preferably, the molar ratio of hexahydro-1,3,5-triazine of formula (I) to anionic initiator is in a range of from 0.01 to 50, more preferably in a range of from 0.1 to 30 (if more than one hexahydro-1,3,5-triazine of formula (I) is used, the amount of hexahydro-1,3,5-triazine so as to calculate this ratio is the total amount of hexahydro-1,3,5-triazines of formula (I) as present).

Preferred anionic initiators are organic lithium compounds.

Organic Lithium Compounds

As to the organic lithium compound, those having a hydrocarbon group having 1 to 20 carbon atoms are preferred. Examples are methyl lithium, ethyl lithium, n-propyl lithium, isopropyl lithium, n-butyl lithium, sec-butyl lithium, tert-octyl lithium, n-decyl lithium, phenyl lithium, 2-naphthyl lithium, 2-butylphenyl lithium, 4-phenylbutyl lithium, cyclohexyl lithium, cyclopentyl lithium, and a reaction product of diisopropenyl-benzene with butyl lithium. Of these compounds, n-butyl lithium and sec-butyl lithium are preferred.

Lithium Amides

Examples for the lithium amide compound are lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methyl-piperadide, lithium ethylpropylamide, lithium ethylbutylamide, lithium ethylbenzylamide and lithium methylphenethylamide. Of these compounds, preferred from the standpoint of the polymerization initiation ability are cyclic lithium amides such as lithium hexamethyleneimide, lithium pyrrolidide, lithium piperidide, lithium heptamethyleneimide and lithium dodecamethyleneimide; and particularly preferred are lithium hexamethyleneimide, lithium pyrrolidide and lithium piperidide.

Also, if more than one anionic initiator is used, the total molar amount is used for calculating molar ratios as referred to herein.

The preparation of copolymers of the invention is possible by using the hexahydro-1,3,5-triazine of formula (I) as a single polar modifier, of by application of a combination of hexahydro-1,3,5-triazine of formula (I) with a further polar modifier (such as a Lewis base and/or a Lewis acid) which also promotes formation of vinyl groups. It is preferred that, together with the hexahydro-1,3,5-triazine of formula (I), one or more further polar modifiers are used in the anionic polymerization. Preferably, the further polar modifier is selected from one or more of Lewis bases and Lewis acids. More preferably, the further polar modifier is selected from ditetrahydrofurylpropane, tetramethylethylenediamine, sodium mentholate, and tetra-hydrofurane.

The polymerization process of this invention is thus typically conducted in the presence of polar modifiers, such as tertiary amines, alcoholates or alkyltetrahydrofurfuryl ethers.

Some representative examples of specific polar modifiers that can be used include methyltetrahydrofurfuryl ether, ethyltetra-hydrofurfuryl ether, propyltetrahydrofurfuryl ether, butyl-tetrahydrofurfuryl ether, hexyltetrahydrofurfuryl ether, octyl-tetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methylmorpholine, N-ethylmorpholine, and N-phenylmorpholine.

A potassium or sodium compound may be added together with the polymerization initiator when it is intended to increase the reactivity of the polymerization initiator or when it is intended to arrange the aromatic vinyl compound at random in the polymer obtained or to allow the obtained polymer to contain the aromatic vinyl compound as a single chain. As the potassium or sodium added together with the polymerization initiator, there can be used, for example: alkoxides and phenoxides, typified by isopropoxide, tert-butoxide, tert-amyloxide, n-heptaoxide, benzyloxide and phenoxide; potassium or sodium salts of organic sulfonic acids, such as dodecylbenzensulfonic acid, tetradecylbenzenesulfonic acid, hexadecylbenzenesulfonic acid, and octadecylbenzenesulfonic acid.

Preferably, the molar ratio of further polar modifier to anionic initiator is in a range of from about 0.01 to about 50, more preferably in a range of from about 0.1 to about 10. If more than one further polar modifier is used, the total molar amount of further polar modifiers is used for calculating molar ratios as referred to herein.

The conjugated diene monomer as used according to the invention is preferably selected from 1,3-butadiene, isoprene, 1,3-pentadiene, 2,3-dimethyl-1,3-butadiene, 2-methyl-1,3-pentadiene, 2,3-dimethyl-1,3-pentadiene, 2-phenyl-1,3-butadiene, and 4,5-diethyl-1,3-octadiene. More preferably, the conjugated diene monomer is selected from 1,3-butadiene and isoprene. In particular, the conjugated diene monomer as used in accordance with the invention is 1,3-butadiene.

Also, the vinylaromatic monomer as used in accordance with the invention is preferably selected from styrene, 1-vinylnaphthalene, 3-methylstyrene, 3,5-diethylstyrene, 4-propyl-styrene, 2,4,6-trimethylstyrene, 4-dodecylstyrene, 3-methyl-5-n-hexylstyrene, 4-phenylstyrene, 2-ethyl-4-benzylstyrene, 3,5-diphenylstyrene, 2,3,4,5-tetraethylstyrene, 3-ethyl-1-vinylnaphthalene, 6-isopropyl-1-vinylnaphthalene, 6-cyclohexyl-1-vinylnaphthalene, 7-dodecyl-2-vinylnaphthalene, and α-methylstyrene. More preferably, the vinylaromatic monomer is selected from styrene, 3-methylstyrene and α-methylstyrene. In particular, the vinylaromatic monomer as used in accordance with the invention is styrene.

In a second aspect, the invention relates to a process for the preparation of a copolymer of conjugated diene monomer and vinylaromatic monomer, the process comprising the following steps:
(1) contacting a monomer component comprising (i) one or more conjugated diene monomers and (ii) one or more vinylaromatic monomers with
  a) an initiator component comprising one or more alkali metal salt derivatives and b) one or more N,N',N''-substituted hexahydro-1,3,5-triazines having the following formula (I):

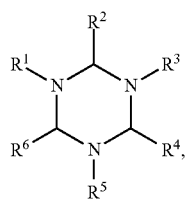

wherein each of $R^1$, $R^3$, and $R^5$ is independently an alkyl, alkenyl, cycloalkyl, cycloalkenyl or an aryl group, or a combination thereof, and $R^1$, $R^3$, and $R^5$ each have 1 to 20 carbon atoms,
and wherein each of $R^2$, $R^4$, and $R^6$ is independently H, an alkyl, alkenyl, cycloalkyl, cycloalkenyl or an aryl group, or a combination thereof, and $R^2$, $R^4$, and $R^6$ may each have up to 20 carbon atoms, b) optionally one or more further polar additives selected from the group of Lewis bases and Lewis acids,
  to initiate anionic copolymerization;
(2) continuing copolymerization; and
(3) optionally coupling;
to give the copolymer.

Further specifics of the process for the preparation of a copolymer of conjugated diene monomer and vinylaromatic monomer are given in U.S. Pat. No. 8,927,644 B2, the disclosure of which is incorporated herein by reference.

Preferably, the coupling agent is a tin halide coupling agent, or silicon halide coupling agent. More preferably, the silicon halide coupling agent is selected from silicon tetrachloride, silicon tetrabromide, silicon tetrafluoride, silicon tetraiodide, hexachlorodisilane, hexabromodisilane, hexafluorodisilane, hexaiododisilane, octachlorotrisilane, octabromotrisilane, octafluorotrisilane, octaiodotrisilane, hexachlorodisiloxane, 2,2,4,4,6,6-hexachloro-2,4,6-trisilaheptane, 1,2,3,4,5,6-hexa-kis[2-(methyldichlorosilyl)ethyl]benzene, and alkyl silicon halides of general formula (III)

wherein $R^7$ is a monovalent aliphatic hydrocarbon group having 1 to 20 carbon atoms or a monovalent aromatic hydrocarbon group having 6 to 18 carbon atoms; n is an integer of 0 to 2; and X is a chlorine, bromine, fluorine, or an iodine atom.

Also, the fraction of units having star structure is between 0% and 75%, by weight of the copolymer of the invention.

According to a third aspect, the invention relates to a copolymer based on conjugated diene monomer and vinylaromatic monomer, the copolymer having
  (a) a content of vinylaromatic monomer from about 30 to about 80 weight percent, based on total weight of polymer;
  (b) a content of vinylaromatic monomer blocks with more than 4 repeating units from about 0.01 to about 32 weight percent, based on total vinylaromatic monomer content; and
  (c) a vinyl content from more than 8 to about 45 weight percent, based on total conjugated diene polymerized fraction.

The copolymer preferably has (a) a content of vinylaromatic monomer from about 35 to about 65 weight percent, based on total weight of polymer, preferably from about 40 to about 55 weight percent.

The copolymer preferably has (b) a content of vinylaromatic monomer blocks with more than 4 repeating units from about 0.05 to about 18 weight percent, more preferably from about 0.1 to about 12 weight percent, in particular from about 0.1 to about 6 weight percent, e.g. from about 0.1 to about 3 weight percent, or from about 0.1 to about 2.5 weight percent, each based on total vinylaromatic monomer content.

Moreover, the copolymer of the invention preferably has (c) a vinyl content from about 10 to about 35 weight percent, preferably from about 14 to about 30 weight percent, in particular from about 18 to about 27 weight percent, each based on total conjugated diene polymerized fraction.

Also, the copolymer of the invention preferably has a ratio Mw/Mn of the uncoupled product in a range of from about 1.01 to about 3.0, preferably in a range of from about 1.01 to about 1.2.

According to a fourth aspect, the invention relates to a method for preparing a rubber comprising vulcanizing the elastomeric copolymer according to the third aspect in the presence of one or more vulcanizing agents. In this method, auxiliaries for the crosslinking of the elastomeric copolymer (crosslinking agents) may be present, or auxiliaries for coupling of the rubber to the filler, or auxiliaries for better dispersion of the filler, or auxiliaries for improvement of the chemical and/or physical properties of the rubbers produced from the elastomeric copolymer. Particular crosslinking agents used are sulphur and sulphur-donor compounds.

Moreover, and according to a fifth aspect, the invention relates to a rubber as obtainable according to the method of the fourth aspect.

Also, and according to a sixth aspect, the invention relates to a rubber composition comprising x) a rubber component comprising the rubber according to the fifth aspect.

The rubber composition preferably further comprises y) one or more fillers, more preferably the filler is selected from the group consisting of silica and carbon black, most preferably the filler component y) comprises both silica and carbon black. The rubbers compositions can be used in the production of highly reinforced rubber mouldings, principally for the production of tires. The inventive rubber compositions may furthermore comprise other auxiliaries, such as the known reaction accelerators, heat stabilizers, light stabilizers, antiozonants, antioxidants, processing aids, plasticizers, tackifiers, blowing agents, dyes, pigments, waxes, extenders, organic acids, retarders, metal oxides, and activators.

Fillers that can be used for the rubber compositions comprise all the known fillers used in the rubber industry. These comprise not only active fillers, but also non-active fillers. Examples are: fine-particle silicas, produced for example via precipitation from solutions of silicates, or flame hydrolysis of silicon halides with specific surface areas of from 10 to 1000 $m^2/g$ (BET and CTAB surface area), preferably from 30 to 400 $m^2/g$, and with a primary particle sizes of from 10 to 1000 nm. The silicas can, if relevant, also take the form of mixed oxides with other metal oxides, such as oxides of Al, of Mg, of Ca, of Ba, of Zn, of Ti, or of Zr; synthetic silicates, such as aluminium silicate, or alkaline earth metal silicate, e.g. magnesium silicate or calcium silicate, with BET surface areas of from 20 to 400 $m^2/g$ and with primary particle diameters of from 10 to 1000 nm; natural silicates, such as kaolin and any other naturally occurring form of silica; metal oxides, such as calcium oxide, zinc oxide, magnesium oxide, or aluminium oxide; metal carbonates, such as magnesium carbonate, calcium carbonate, or zinc carbonate; metal hydroxides, e.g. aluminium hydroxide or magnesium hydroxide; carbon blacks prepared by the flame-black process, channel-black process, furnace-black process, gas black process, thermal-black process, acetylene-black process, or arc process, their BET surface areas being from 10 to 250 $m^2/g$, e.g.: conductive furnace (CF), super conductive furnace (SCF), super abrasion furnace (SAF), intermediate super abrasion furnace (ISAF), intermediate super abrasion furnace low structure (lSAF-LS), intermediate super abrasion furnace high modulus (ISAF-HM), intermediate super abrasion furnace low modulus (lSAF-LM), intermediate super abrasion furnace high structure (lSAF-HS), high abrasion furnace (HAF), high abrasion furnace low structure (HAP-LS), high abrasion furnace high structure (HAP-HS), fine furnace high structure (FF-HS), semi reinforcing furnace (SRF), extra conductive furnace (XCF), fast extruding furnace (FEE), fast extruding furnace low structure (FEE-LS), fast extruding furnace high structure (FEE-HS), general purpose furnace (GPF), general purpose furnace high structure (GPF-HS), all-purpose furnace (APP), semi reinforcing furnace low structure (SRF-LS), semi reinforcing furnace low modulus (SRF-LM), semi reinforcing furnace high structure (SRF-HS), semi reinforcing furnace high modulus (SRF-HM) and medium thermal (MT) carbon blacks, or the following types according to ASTM classification: N110, N219, N220, N231, N234, N242, N294, N326, N327, N330, N332, N339, N347, N351, N356, N358, N375, N472, N539, N550, N568, N650, N660, N754, N762, N765, N774, N787 and N990 carbon blacks.

The fillers mentioned can be used alone or in admixture. In a particularly preferred embodiment, the rubbers comprise, as further filler constituents, a mixture composed of pale-colored fillers, such as fine-particle silicas, and of carbon blacks, where the mixing ratio (by weight) of pale-colored fillers to carbon blacks is from 0.05:1 to 25:1, preferably from 0.1:1 to 22:1. The amount of the fillers is typically in a range of from 10 to 500 parts by weight of filler, based on 100 parts by weight of rubber component x). It is preferable to use from 10 to 200 parts by weight.

Preferably, the rubber composition according to the sixth aspect has an amount of filler component y) in a range of from 10 to 150 parts by mass relative to 100 parts by mass of the rubber component x) (phr), more preferably the amount of component y) is 20 to 140 phr, most preferably the amount of component y) is 30 to 130 phr.

It is also preferred that the rubber composition according to the sixth aspect has a rubber component x) which comprises one or more further rubbery polymers, more preferably the further rubbery polymer is selected from the group consisting of natural rubber, synthetic isoprene rubber, butadiene rubber, ethylene-α-olefin copolymer rubber, ethylene-α-olefin-diene copolymer rubber, acrylonitrile-butadiene copolymer rubber, chloroprene rubber and halogenated butyl rubber.

The further rubbery polymer may be a natural rubber, or some synthetic rubber other than the rubber according to the fifth aspect. The amount of further rubbery polymer is usually in the range from 0.5 to 90% by weight, preferably from 10 to 70% by weight, based on the entire amount of rubber in the rubber mixture. The amount of further rubbery polymer depends on the respective intended use of the rubber composition.

Examples of further rubbery polymer are natural rubbers, and also synthetic rubbers. Synthetic rubbers known from the literature are presented as an example. They comprise: BR—polybutadiene, ABR—butadiene-$C_{1-4}$-alkyl acrylate copolymers, CR—polychloroprene, IR—polyisoprene, SBR—styrene-butadiene copolymers having styrene contents of from 1 to 60% by weight, preferably from 10 to 50% by weight, IIR—isobutylene-isoprene copolymers, NBR—butadiene-acrylonitrile copolymers having acrylonitrile contents of from 3 to 60% by weight, preferably from 15 to 40% by weight, HNBR—partially hydrogenated or fully hydrogenated NBR rubber, EPDM—ethylene-propylene-diene terpolymers, and also mixtures of these further rubbery polymers. Materials of interest for the production of vehicle tires are more particularly natural rubber, emulsion SBR, and also solution SBR, with glass transition temperatures above −100° C., polybutadiene rubber with a high cis content (>90%), produced using catalysts based on Ni, Co, Ti or Nd, and also polybutadiene rubbers having a vinyl content of up to 85%, as well as mixtures of these.

According to a seventh aspect of the invention, a tire component comprises the rubber composition according to the sixth aspect. Preferably, the tire component is a tire tread.

Finally, and according to an eighth aspect, a tire comprises the tire component of the seventh aspect.

In particular, the present invention relates to diene rubbers having a high styrene content, and to the use thereof for the production of rubber vulcanizates which serve in particular for the production of highly reinforced rubber mouldings, particularly preferably for the production of tires, where these have particularly high wet skid resistance, low rolling resistance when functionalized and very good handling properties. The very high styrene content in the rubbers of the invention imparts very good tensile properties as well as high tear resistance to the rubber compositions. Additionally, a low content of styrene blocks prevents the creation of styrene domains in the rubber matrix.

The advantages of the present invention are particularly apparent from the following examples.

Examples

Characterization of the Copolymers
Vinyl Content (%)
Determined by 600 MHz $^1$H-NMR, based on BS ISO 21561:2005.
Bound Styrene Content (%)
Determined by 600 MHz $^1$H-NMR, based on BS ISO 21561:2005.
Block Styrene Content (%) was Determined by 600 MHz $^1$H-NMR.

The content of block styrene consisting of more than 6 consecutive styrene units was determined according to the method reported by Y. Tanaka et al. in Rubber Chemistry and Technology, 1981, 54, No. 4,685-691 using the relative intensity of ortho Ph-proton signals resonating higher than 6.7 ppm.

The content of block styrene consisting of 4 and more consecutive styrene units was determined according to the method described in German Patent Document No. DE69712962 using the relative intensity of the ortho Ph-proton signals resonating in the range between 6.94 and 6 ppm.

The content of block styrene consisting of 4 to 6 consecutive units was calculated from the difference between both of the above-described block styrene contents.

Molecular Weight Determination
Gel permeation chromatography was performed via PSS Polymer Standards Service multiple columns (with guard column), using THF as the eluent and for sample preparation. Multi-angle laser light scattering measurements were carried out using a Wyatt Technologies Dawn Heleos II light scattering detector, DAD (PDA) Agilent 1260 Infinity UV-VIS detector and Agilent 1260 Infinity refractive index detector.
Glass Transition Temperature (° C.)
Determined according to PN-EN ISO 11357-1:2009.
Mooney Viscosity (ML 1+4, 100° C.)
Determined based on ASTM D 1646-07, using an L rotor under the following conditions: preheating=1 minute, rotor operating time=4 minutes, and temperature=100° C., Examples All experiments were performed at the same preparation manner where different reaction conditions were applied.

Polymerization
Inertization Step:
Cyclohexane (10 kg) was added to a nitrogen-purged twenty-two liter reactor and treated with 2 g of 1.6 M n-butyl lithium solution in cyclohexane. The solution was heated up under the reflux conditions (80-82° C.) and vigorously stirred for 10 minutes, to perform cleaning and inertization of the reactor. After that, solvent was removed via a drain valve and nitrogen was purged again.

General Polymerization Procedure:
Cyclohexane was charged to the inerted reactor, followed by addition of styrene and butadiene monomers, where the mass ratio of styrene to butadiene (ST/BD) depended on the desired styrene content (30-80 wt %). Next, 1,3,5-trimethylhexahydro-1,3,5-triazine (TMT) was introduced into the reactor, in order to provide the desired content of styrene blocks (blockiness), where the molar ratio of TMT to initiator was in a range from 0.01 to 50:1 depending on total styrene content. Amounts of solvent, monomers, and additives depended on the scale of the reaction and are given in Tables 1 and 2.

The solution inside the reactor was heated and continuously stirred during the whole process. The temperature of the reaction mixture was kept between 60 and 90° C., where the exact temperature determined the vinyl unit content and partially influenced blockiness of styrene units. Then, n-butyl lithium (BuLi) was added to initiate the polymerization process, where the exact amount of n-BuLi determined the molecular weight of polymer. The reaction was carried out as an isothermic process, up to 120 minutes. The reaction solution was terminated, using nitrogen-purged isopropyl alcohol in the double molar amount as compared to n-butyl lithium, and was rapidly stabilized by the addition of 2-methyl-4,6-bis(octylsulfanylmethyl)phenol (at 1.0 phr polymer).

The polymer solution was transferred to a stripper. The reactor was flushed with portions of fresh cyclohexane and its contents were also transferred to the stripper. Distilled water was added to the polymer solution, in an amount of double of the total mass of polymer solution, and the stripper contents were then treated with steam. Steam-stripping was carried out until the entire amount of cyclohexane had been removed, and rubber crumbs were obtained. Then, the rubber crumbs were removed from the stripper, cooled to room temperature, milled and dried in a stream of hot air.

Details of the reaction conditions, of the used recipes and characteristics of the obtained polymers are included in Table 1 and Table 2. Examples 1-8 in Table 1 show the influence of increasing content of TMT/n-BuLi expressed as molar ratios on the formation of vinyl groups and the blockiness of styrene in a HS-LV-SBR containing about 40% of styrene. Examples 9-15 in Table 1 show the influence of a constant molar ratio of TMT/n-BuLi (of about 5/1) on the blockiness of styrene in an UHS-LV-SBR containing from 45% to 80% of styrene.

Examples 16-21 in Table 2 show the influence of the use of a mixture of TMT and TMEDA on the formation of vinyl groups and the blockiness of styrene in a HS-LV-SBR containing about 40% of styrene.

TABLE 1

Application of TMT as a polar modifier in the synthesis of HS-LV-SBR and UHS-LV-SBR rubber.

| | Reaction conditions | | | | | GPC results | | | $^1$H NMR results | | | DSC results |
|---|---|---|---|---|---|---|---|---|---|---|---|---|
| Ex. | T [° C.] | Cyclo-hexane [g] | styrene [g] | 1,3-butadiene [g] | TMT/BuLi molar ratio | Mn [kg/mol] | Mw [kg/mol] | Mw/Mn | Vinyl | styrene | styrene block | Tg, ° C. |
| 1 | 60 | 800 | 56 | 84 | 5.11 | 238.6 | 241.7 | 1.01 | 26.3% | 40.4% | 0.1% | −31 |
| 2 | 60 | 800 | 56 | 84 | 1.38 | 276.6 | 284.0 | 1.03 | 18.6% | 40.1% | 1.7% | −39 |
| 3 | 60 | 800 | 56 | 84 | 0.91 | 229.9 | 236.3 | 1.03 | 17.1% | 40.1% | 4.2% | −45 |
| 4 | 60 | 800 | 56 | 84 | 0.72 | 246.4 | 252.8 | 1.03 | 15.4% | 40.2% | 7.3% | −50 |
| 5 | 60 | 800 | 56 | 84 | 0.75 | 325.7 | 333.6 | 1.02 | 14.4% | 40.1% | 10.0% | −54 |
| 6 | 60 | 800 | 56 | 84 | 0.66 | 197.8 | 201.6 | 1.02 | 13.1% | 40.2% | 14.0% | −64 |
| 7 | 60 | 800 | 56 | 84 | 0.27 | 160.0 | 162.2 | 1.01 | 11.0% | 40.2% | 19.5% | −70 |
| 8 | 60 | 800 | 56 | 84 | 0.13 | 226.2 | 231.6 | 1.02 | 10.0% | 40.3% | 27.4% | −77 |
| 9 | 70 | 800 | 63 | 77 | 5.5 | 408.2 | 448.6 | 1.10 | 25.4% | 45.3% | 0.4% | −24 |
| 10 | 70 | 800 | 68 | 72 | 5.9 | 482.1 | 572.5 | 1.19 | 22.1% | 48.3% | 0.5% | −19 |
| 11 | 70 | 800 | 71 | 69 | 5.1 | 263.1 | 266.4 | 1.01 | 26.5% | 50.5% | 0.6% | −14 |
| 12 | 70 | 800 | 76 | 64 | 5.2 | 270.1 | 278.2 | 1.03 | 21.7% | 54.1% | 2.5% | −11 |
| 13 | 70 | 800 | 83 | 57 | 5.5 | 241.4 | 265.5 | 1.10 | 21.8% | 59.0% | 5.7% | −5 |
| 14 | 70 | 800 | 91 | 49 | 5.4 | 249.3 | 269.2 | 1.08 | 20.7% | 64.7% | 15.5% | 4 |
| 15 | 70 | 800 | 108 | 32 | 5.3 | 233.7 | 247.7 | 1.06 | 27.4% | 77.4% | 31.1% | 14 |

TABLE 2

Application of TMT with addition of TMEDA as polar modifiers in the synthesis of HS-LV-SBR and UHS-LV-SBR rubber.

| | Reaction conditions | | | | | | GPC results | | | $^1$H NMR results | | | DSC results |
|---|---|---|---|---|---|---|---|---|---|---|---|---|---|
| Ex | T [° C.] | Cyclo-hexane [g] | Styrene [g] | 1,3-buta-diene [g] | TMT/BuLi molar ratio | TMEDA/BuLi molar ratio | Mn [kg/mol] | Mw [kg/mol] | Mw/Mn | Vinyl | styrene | styrene block | Tg [° C.] |
| 16 | 70 | 800 | 55 | 85 | 8.0 | 0.9 | 300.7 | 325.7 | 1.08 | 26.0% | 39.5% | 0.8% | −34.05 |
| 17 | 70 | 800 | 55 | 85 | 8.0 | 2.0 | 297.8 | 350.5 | 1.18 | 29.3% | 39.5% | 1.0% | −32.53 |
| 18 | 70 | 800 | 55 | 85 | 8.0 | 3.5 | 293.5 | 312.2 | 1.06 | 32.2% | 39.4% | 0.9% | −30.41 |
| 19 | 70 | 800 | 55 | 85 | 8.0 | 4.2 | 293.7 | 315.5 | 1.07 | 36.2% | 39.1% | 1.0% | −26.85 |
| 20 | 70 | 800 | 54 | 86 | 8.0 | 6.0 | 256.0 | 309.4 | 1.21 | 40.1% | 38.6% | 1.1% | −24.28 |
| 21 | 70 | 800 | 53 | 87 | 8.0 | 8.8 | 292.1 | 324.6 | 1.11 | 42.9% | 38.1% | 1.1% | −23.95 |

The invention claimed is:

1. A copolymer based on conjugated diene monomer and vinylaromatic monomer, the copolymer having
   (a) a content of vinylaromatic monomer from about 35 to about 55 weight percent, based on total weight of polymer;
   (b) a content of vinylaromatic monomer blocks with more than 4 repeating units from about 0.01 to about 12 weight percent, based on total vinylaromatic monomer content; and
   (c) a vinyl content from more than 8 to about 35 weight percent, based on total conjugated diene polymerized fraction.

2. The copolymer of claim 1, wherein the (a) content of vinylaromatic monomer is from about 40 to about 55 weight percent.

3. The copolymer of claim 1, wherein the (b) content of vinylaromatic monomer blocks with more than 4 repeating units is from about 0.05 to about 12 weight percent, based on total vinylaromatic monomer content.

4. The copolymer of claim 1, wherein the (c) vinyl content is from about 10 to about 35 weight percent, based on total conjugated diene polymerized fraction.

5. The copolymer of claim 1, wherein Mw/Mn of the uncoupled product is in a range of from about 1.01 to about 3.0.

6. A method for preparing a rubber comprising vulcanizing the elastomeric copolymer according to claim 1 in the presence of one or more vulcanizing agents.

7. A rubber as obtainable according to the method of claim 6.

8. A rubber composition comprising x) a rubber component comprising the rubber according to claim 7.

9. The rubber composition according to claim 8, further comprising y) one or more fillers.

10. The rubber composition according to claim 9, wherein the amount of filler component y) is 10 to 150 parts by mass relative to 100 parts by mass of the rubber component x) (phr).

11. The rubber composition according to claim 8 wherein the rubber component x) also comprises one or more further rubbery polymers.

12. A tire component comprising the rubber composition according to claim 8.

13. A tire comprising the tire component of claim 12.

14. The copolymer of claim 3, wherein the (b) content of vinylaromatic monomer blocks with more than 4 repeating units is from about 0.1 to about 12 weight percent, based on total vinylaromatic monomer content.

15. The copolymer of claim 14, wherein the (b) content of vinylaromatic monomer blocks with more than 4 repeating units is from about 0.1 to about 6 weight percent, based on total vinylaromatic monomer content.

16. The copolymer of claim 15, wherein the (b) content of vinylaromatic monomer blocks with more than 4 repeating units is from about 0.1 to about 3 weight percent, or from about 0.1 to about 2.5 weight percent, each based on total vinylaromatic monomer content.

17. The copolymer of claim 4, wherein the (c) vinyl content is from about 18 to about 27 weight percent, based on total conjugated diene polymerized fraction.

18. The copolymer of claim 5, wherein Mw/Mn of the uncoupled product is in a range of from about 1.01 to about 1.2.

19. The rubber composition according to claim 9, wherein the filler is selected from the group consisting of silica, carbon black, and mixtures thereof.

20. The rubber composition according to claim 10, wherein the amount of component y) is 30 to 130 phr.

21. The rubber composition according to claim 11, wherein the further rubbery polymer is selected from the group consisting of natural rubber, synthetic isoprene rubber, butadiene rubber, ethylene-α-olefin copolymer rubber, ethylene-α-olefin-diene copolymer rubber, acrylonitrile-butadiene copolymer rubber, chloroprene rubber and halogenated butyl rubber.

22. The tire component of claim 12, wherein the tire component is a tire tread.

* * * * *